United States Patent
Poix et al.

(10) Patent No.: US 6,261,652 B1
(45) Date of Patent: Jul. 17, 2001

(54) METHOD FOR PRODUCING A VACUUM BETWEEN TWO GLASS SHEETS AND INSULATING GLAZING

(75) Inventors: Rene Poix, Noyon; Stephane Margerand, Nanteuil les Meaux; Yves Demars, Clermont, all of (FR); Ivar Moltke, Bagsvaard (DK); Mikael Bredsdorff, Copenhague (DK); Eik Bezzel, Birkerod (DK)

(73) Assignees: Saint-Gobain Vitrage, Courbevoie (FR); Danish Technological Institute, Taastrup (DK)

( * ) Notice: Subject to any disclaimer, the term of this patent is extended or adjusted under 35 U.S.C. 154(b) by 0 days.

(21) Appl. No.: 09/043,579

(22) PCT Filed: Jul. 31, 1997

(86) PCT No.: PCT/FR97/01430

§ 371 Date: Aug. 26, 1998

§ 102(e) Date: Aug. 26, 1998

(87) PCT Pub. No.: WO98/04802

PCT Pub. Date: Feb. 5, 1998

(30) Foreign Application Priority Data

Jul. 31, 1996 (FR) .................................................. 96 09632

(51) Int. Cl.[7] ................................ E06B 3/24; E04C 2/54
(52) U.S. Cl. ......................... 428/34; 428/120; 52/786.13
(58) Field of Search ............................ 428/34, 120, 192; 52/786.1, 786.15

(56) References Cited

U.S. PATENT DOCUMENTS

| 3,778,126 | * | 12/1973 | Wilson | 316/20 |
| 4,683,154 | | 7/1987 | Benson et al. | 428/34 |
| 4,786,344 | * | 11/1988 | Beuther | 428/34 |
| 5,664,395 | * | 9/1997 | Collins et al. | 428/34 |

FOREIGN PATENT DOCUMENTS

| 0047725 | * | 3/1982 | (EP) . |
| 0 421 239 | | 4/1991 | (EP) . |
| 0 645 516 | | 3/1995 | (EP) . |
| WO 87/03327 | | 6/1987 | (WO) . |
| WO 91/02878 | | 3/1991 | (WO) . |
| WO 96/12862 | | 5/1996 | (WO) . |

* cited by examiner

*Primary Examiner*—Donald J. Loney
(74) *Attorney, Agent, or Firm*—Oblon, Spivak, McClelland, Maier & Neustadt, P.C.

(57) ABSTRACT

A method of producing a vacuum between two glass sheets to form an insulating glazing. One of the sheets has a hole drilled in its thickness. Spacers are placed between the two glass sheets with the sealing joint being placed around the periphery of the sheets. A vacuum is created between the sheets through the hole which is then closed. The spacers are fixed on one of the sheets by bonding with a mineral compound covering at least the bonding zones on the glass sheet. The second sheet is placed on the spacers and on the peripheral sealing joint. The peripheral sealing and the bonding with the spacers are simultaneously effected by raising the temperature.

8 Claims, 3 Drawing Sheets

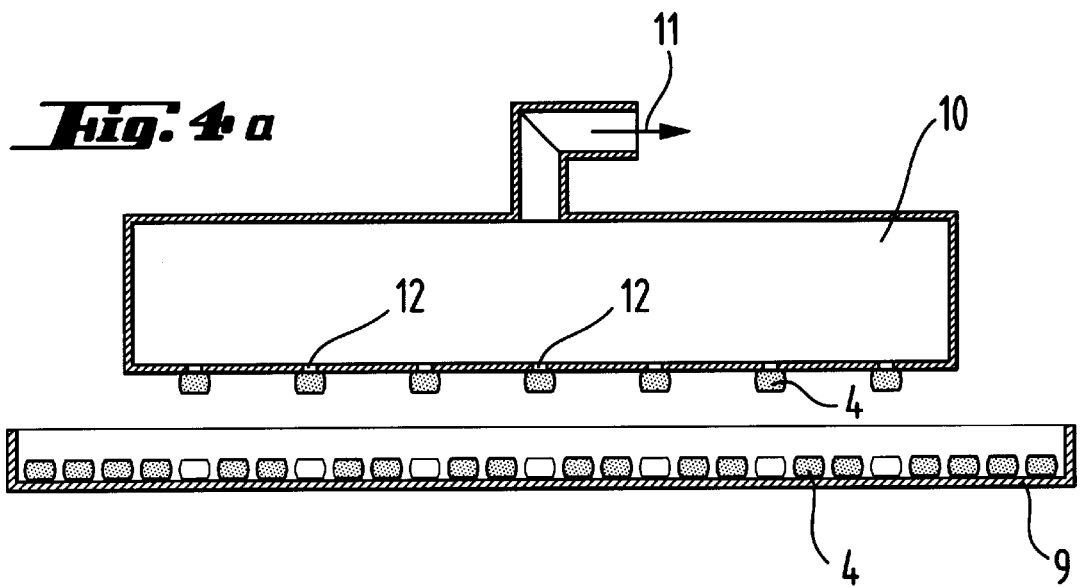
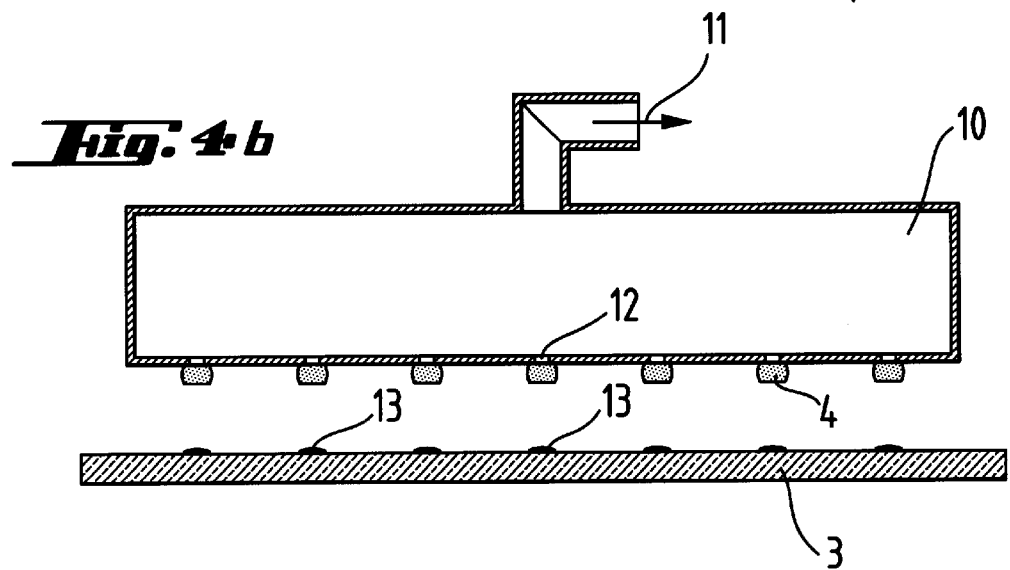
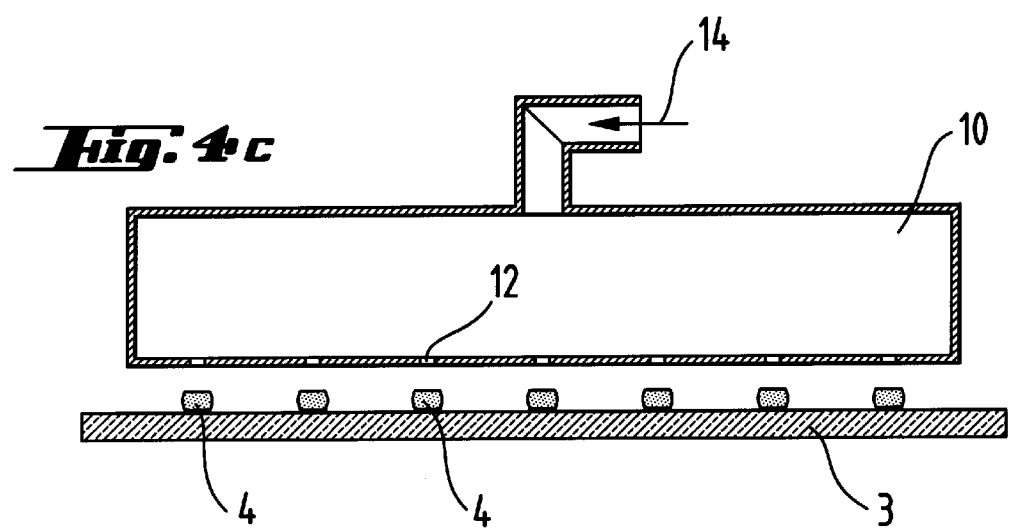

METHOD FOR PRODUCING A VACUUM BETWEEN TWO GLASS SHEETS AND INSULATING GLAZING

BACKGROUND OF THE INVENTION

1. Field of the Invention

The invention relates to a method for producing a vacuum between two sheets of glass and insulating glazing thus produced.

The method according to the invention, although it is not limited to the production of insulating glazing, will be described more particularly by reference to this applications

2. Discussion of the Background

It is usual, in order to obtain thermal and/or acoustic insulation, to produce insulating glazing including two sheets of glass separated from one another by a relatively thick air gap. Such glazing provides thermal insulation which is judged to be insufficient for certain occasions. To remedy that, it is known to produce glazing including three sheets of glass and one of the air gaps can be replaced by a gas, for example krypton. This glazing has markedly enhanced thermal insulation properties, but is so thick that it is not always easy to use it.

Moreover, current demand from the users is turning towards thermal insulation of glazing equivalent to that of solid walls. Insulating glazing had already been proposed, particularly in Patent No. WO-91/02878, consisting of two sheets of glass separated from one another by a space in which a vacuum has been produced.

This glazing, due to the vacuum, achieves very good insulation but it is very difficult to produce. On the one hand, the slight thickness between the two sheets of glass, which is of a few tenths of a millimeter, has to be constant over the whole region where the sheets of glass are face-to-face.

Moreover, a perfectly leaktight seal has to be formed between the two sheets of glass.

Patent No. WO-91/02878 describes a technique consisting in placing studs a few tenths of a millimeter thick on one of the sheets of glass, which are distributed over the whole surface, and, at the same time, a joint which will allow the two sheets of glass to be sealed. These studs and this seal are produced in the same material, which is a glass-making composition. It is apparent that this glazing is difficult to produce due to these simultaneous operations which require intricate handling.

Moreover, the sealing joint has a number of bubbles which can impair the leaktightness and the aesthetics.

This patent also describes a method for forming the vacuum between the two sheets of glass. It particularly proposes inserting a tube between the two sheets of glass before sealing, to which a connection is made in order to pump out the air. Another embodiment consists in piercing a hole through one of the sheets of glass and in pumping out the air through this orifice.

In the first case, it is necessary to seal the tube in a leaktight fashion at the same time as the sheets of glass, which makes the operations difficult. Moreover, it is necessary, after having formed the vacuum, to seal the end of the tube, then to protect this end in order to avoid breaking.

In the second case, the vacuum is formed by means of a tube previously sealed around the hole. Then, after having formed the vacuum, this tube is melted so as to seal its end. The disadvantage of these embodiments is that the insulating glazing provided has a fragile point either on the periphery or on one surface. In the second case, part of the tube remains outside the glazing, which increases the risks of damage.

SUMMARY OF THE INVENTION

The object of the invention is a method for producing a vacuum between two sheets of glass, which is simple to produce, with the glazing produced advantageously having no fragile point.

This object is achieved according to the invention by a method for producing a vacuum between two sheets of glass capable, in particular, of constituting insulating glazing, one of the sheets of glass including a hole pierced through its thickness, consisting, after having deposited spacers between the two sheets of glass, in forming a sealing joint at the periphery of the sheets of glass, in forming the vacuum and in stopping the hole, the spacers being fixed on to a sheet of glass by bonding with an inorganic compound covering at least the bonding areas on the sheet of glass, the second sheet of glass being deposited on the spacers and on the peripheral sealing joint, and bonding with the inorganic compound being carried out simultaneously with the peripheral sealing.

According to a first embodiment, the inorganic compound is sodium silicate in aqueous solutions. This compound advantageously coats the spacers and is dried before they are deposited on the sheet of glass. This drying allows easy handling of the spacers. Bonding of the spacers to the sheet of glass is achieved by remoistening the inorganic compound, then drying them.

According to another embodiment, the inorganic compound is an enamel.

In particular, this second embodiment according to the invention is, on the one hand, simplified because the second sheet of glass can simply come to rest on the spacers which are integral with the first sheet of glass. This technique allows precise depositing of the second sheet of glass, which is less strict than according to the known techniques, the deposition being able to be slightly corrected, for example by sliding. Moreover, at this stage of the method, the enamel has not yet been fired, but the usual enamel pastes exhibit sufficient viscosity to hold the spacers in place, more particularly after the enamel paste has dried, during the phase of putting in place and positioning the sheet of glass. Moreover, a variant can provide for the sealing joint advantageously to be put in place after the second sheet of glass, still in order to facilitate the positioning thereof.

Moreover, the method makes provision to carry out the sealing and the firing of the bonding enamel simultaneously, which limits the number of stages of the method. For preference, the bonding enamel is identical to the sealing joint; otherwise the firing temperatures are advantageously chosen to be similar.

According to a first embodiment of the invention, the bonding of the spacers is carried out by successive depositions of dots of inorganic bonding compound, for example by screen printing, then depositions of the spacers by a suction tool pierced with holes which are smaller than the spacers, at the same pitch as the dots obtained.

The dots of inorganic bonding compound can be deposited by any type of device known to a person skilled in the art, making it possible to form dots with a diameter of the order of 0.5 mm and with a thickness of a few tens of microns and to arrange them very precisely with a regular pitch. Such a pitch particularly allows a number of dots lying advantageously between 600 and 1500 per square meter, and preferably equal to 1000 per square meter.

For preference, the suction tool picks up and transports the spacers previously arranged on a plate and deposits them on the dots of inorganic compound by stopping the suction and possibly by blowing.

The spacers according to the invention advantageously have a parallel-face, bi-truncated spherical shape. Such a shape makes it possible to place all the spacers on a plate in the same position, for example by causing the plate to vibrate; this occurs because the bulging part of the spacers has a tendency to bring them on to one of the parallel faces. Moreover, the previously described shape associated with the suction tool allows good gripping of the spacers and precise deposition thereof, one of the flat faces ensuring good stability, including before firing the bonding enamel. Such spacers advantageously have a distance between the parallel faces of between 0.1 and 0.3 millimeter and a diameter, in the region of the bulging part, of less than 0.5 millimeters.

According to a second embodiment of the method according to the invention, the bonding of the spacers is carried out by depositing the spacers on the surface of a sheet of glass, said spacers previously being covered, over the area coming into contact with the glass, with the inorganic bonding compound.

For preference, the spacers are transported by a suction tool which, during transport, moistens the relevant area of the spacers with a composition of the inorganic bonding compound, then they are deposited on the glass, having already been covered with the inorganic bonding compound on the desired area.

Concerning the sealing phase, during which the bonding of the spacers is simultaneously carried out, the method according to the invention advantageously makes provision to exert pressure between the two sheets of glass. Such pressure ensures that the sealing joint is brought to the same height as the spacers. This occurs because the sealing joint is initially deposited with a thickness greater than that of the spacers and is thus brought back to the desired thickness by squeezing.

Concerning the stopping of the hole provided in the thickness of one of the sheets of glass in order to form the vacuum, the invention provides for the stopper to be held close to the hole so as to let the air pass through, and which can be soldered to the glass. Such a stopper is advantageously produced from glass or metal. The link between the stopper and the sheet of glass is preferably obtained by inorganic welding, such as an enamel or sintered glass, the melt point of which is less than that of the glass and of the stopper. According to a preferred embodiment, before the vacuum-forming stage, a ring of silver-based enamel is deposited around the hole, and after firing, the ring is tinned and finally partially welded to a tinned inorganic disc. Firing of the silver enamel is advantageously carried out either simultaneously with that of the bonding enamel, or during a thermal toughening stage if such a stage is carried out.

Such an embodiment makes it possible to arrange, close to the hole, the disc intended to stop it, while keeping the hole open and allowing the vacuum to be produced for example by the use of a bell housing arranged around the hole.

According to this configuration, in the course of the vacuum-forming phase, the temperature is raised locally around the hole until the tin melts. Thus, the disc is soldered on to the sheet of glass and the hole is stopped, the vacuum being formed between the two sheets of glass.

Assembling the two sheets of glass between which the vacuum has been formed is simple to carry out. Moreover, the stopping of the hole through which the vacuum is formed does not constitute a fragile point and is relatively discreet; the excess thickness obtained in the region of the hole can be less than 1 mm.

According to a variant of the invention, a tinned metal ring is fastened to the glass by a solder glass replacing the silver-based enamel. This variant leads to a slightly greater excess thickness.

The techniques for stopping the hole which have just been described are entirely suitable for the technique of assembling the previously described sheets of glass, and more particularly for the choice and the fitting of the spacers as well as for the peripheral sealing; however, the invention does not exclude the possibility of combining the technique for stopping a hole in order to create a vacuum with other types of assembly.

The invention also proposes insulating vacuum glazing particularly capable of being produced according to the previously described method.

According to the invention, the insulating vacuum glazing consists of two sheets of glass held apart from one another by spacers and a peripheral sealing joint, said spacers being parallel-faced bi-truncated spheres made of ceramic. The sheets have advantageously undergone toughening treatment in order to reinforce their mechanical properties. For preference, this is a heat treatment toughening which leads to compression stresses over a relatively substantial thickness. The spacers are produced, for example, from a crystalline phase of zircons in a vitreous phase of silica.

According to a preferred embodiment of the invention, the parallel-faced bi-truncated spheres are obtained from balls coated in a material which can be poured and which can easily be separated from the spacers subsequently, for example by thermal and/or chemical and/or mechanical action. Such a material is, for example, tin, a metal alloy, an organic binder, a binder such as plaster, etc. The balls are coated in the material so as to form a single layer, said layer being eroded on its two faces. The balls used are, for example, balls usually used for cleaning glass-making moulds by sand blasting.

Also preferably, the sealing joint is an enamel, the firing temperature of which is less than 450° C. The temperature reached must not, in particular, cause the stresses obtained by toughening to be relaxed.

The glazing according to the invention may also include, on its outer surface, an inorganic disc or pellet soldered to the glass. As previously described, such a disc is used to stop the hole which served to form the vacuum. This disc is preferably placed on the edge of the glazing for reasons of discreetness and particularly so as to be masked by the mounting devices.

The soldering of the disc is advantageously carried out using tin, and contact with the glass takes place via a layer of silver-based enamel.

According to other advantageous embodiments, the invention makes provision for using at least one sheet of glass covered with one or more functional layers, on at least one of its faces. Such layers are, for example, low-emissive layers as described in the French Patent No. 2,701,474. In the case in which a layer of this type is produced on the inner face of the glazing, that is to say a face subsequently in contact with the vacuum, the invention preferably makes provision for the layer to be removed over the peripheral area of the surface corresponding to the area covered by the sealing joint; this removal may allow better adhesion of the joint.

BRIEF DESCRIPTION OF THE DRAWINGS

Other advantageous characteristics and details of the invention will emerge below from the description of an embodiment according to the invention, given by reference to the figures which represent:

FIGS. 4a, b, c: successive stages of the deposition of the spacers according to the invention.

The various figures are not represented to scale in order to simplify understanding thereof.

DISCUSSION OF THE PREFERRED EMBODIMENTS

Figure 1:
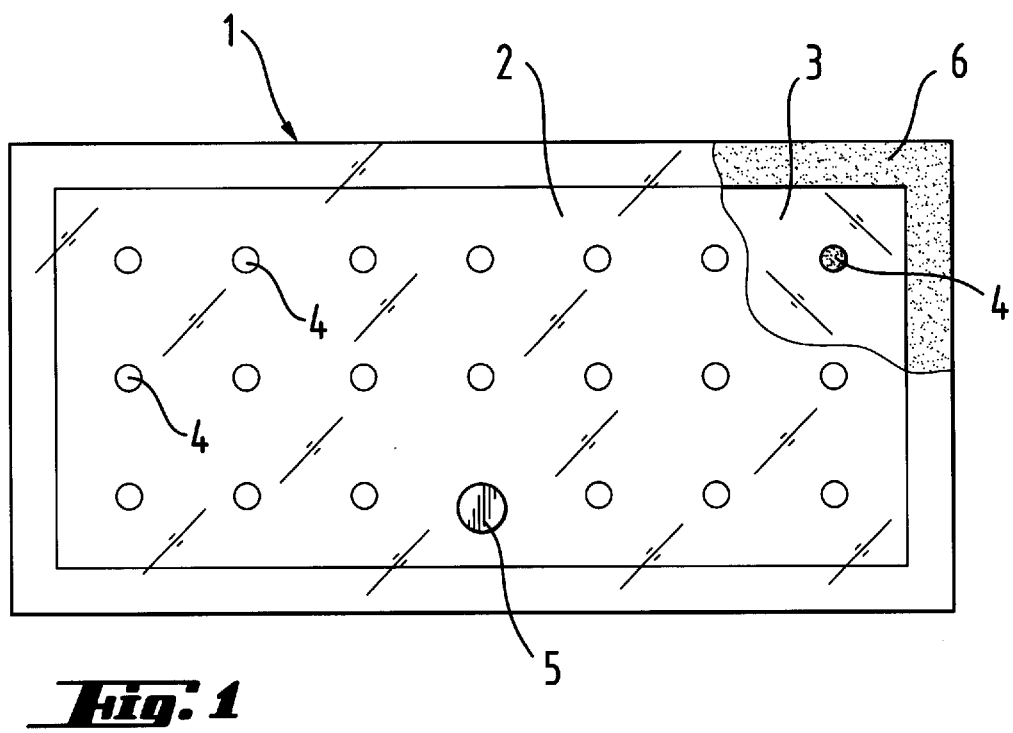
FIG. 1: a top view of insulating glazing according to the invention.

FIG. 1 represents a top view of insulating vacuum glazing 1. This glazing 1 consists of two sheets of glass 2, 3 held at a distance from one another by spacers 4 which are visible in transparency in FIG. 1. The sheets of glass are 4 mm thick and have previously undergone toughening heat treatment with a view to reinforcing their mechanical properties so that they withstand the stresses which are exerted when the vacuum is formed.

In FIG. 1, it is apparent that these spacers 4 are distributed over the entire surface of the glazing 1 in a regular way. They are spaced 30 millimeters from one another. This distribution of the spacers 4 makes it possible to keep a space between the sheets of glass 2, 3. Their number, dimension and distribution are determined so as to guarantee high strength for the glazing 1 and to prevent any risk of contact between the sheets of glass 2 and 3, and so as not to create too large a thermal bridge and not to impair light transmission.

Figure 2:
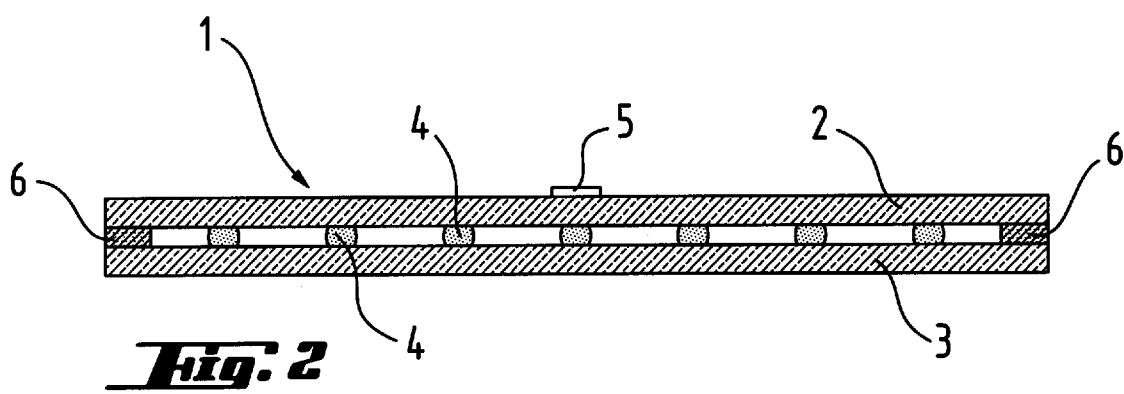
FIG. 2: a side view in elevation of the glazing of FIG. 1.
Figure 3:
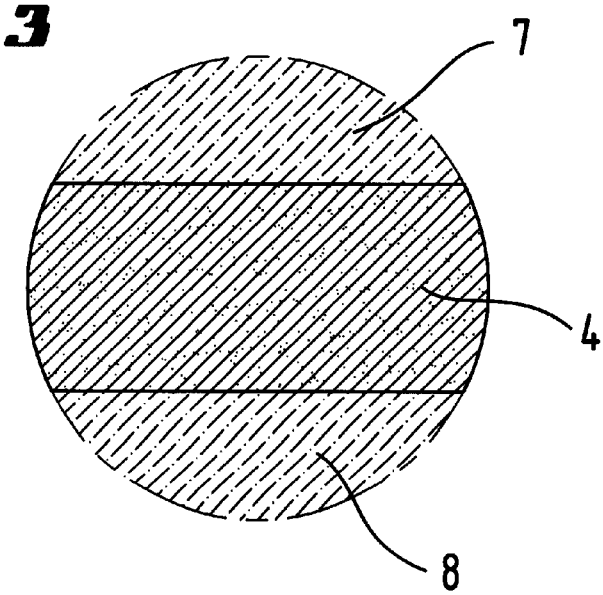
FIG. 3: a side view of a spacer according to the invention.

Moreover, the spacers 4 are produced in zircon. The spacers 4 thus possess various properties which are necessary for their use and have more particularly low thermal conductivity which makes it possible to avoid a thermal bridge being created between the two sheets of glass 2, 3. They also have good resistance to compression and high toughness ensuring that the glazing 1 behaves well during creation of the vacuum, then during its use. In FIGS. 2 and 3, the spacers 4 appear with a parallel-faced, bi-truncated spherical shape with bulging sides. The method of producing such spacers 4, as well as the advantages which their shape affords for handling and fitting the spacers 4, will be discussed later. As to their function, which is to keep a space between the two sheets of glass 2, 3, it is apparent that the flat surfaces in contact with the glass avoid a point contact such as that with a ball and confer greater stability once positioned.

A disc 5 which stops the hole which has served to form the vacuum in the glazing 1 also appears in FIGS. 1 and 2. This disc 5 is made of copper. It can be positioned anywhere on the glazing 1, and preferably on one edge for the sake of discreetness. For preference, furthermore, it is situated at the center of one long edge of the glazing 1, as represented in FIG. 1; this arrangement is advantageous when the vacuum is formed as such a position particularly makes it possible to reduce the pumping time for a given suction as far as possible.

A sealing joint 6 also appears in FIGS. 1 and 2. This joint 6 is produced with an enamel paste, the firing temperature of which, for eliminating the organic components, is of the order of 450° C. This temperature particularly makes it possible to avoid relaxing the toughening stresses which appear only at high temperatures. During production of the glazing 1, the sealing joint 6 is deposited over a width of between 3 and 4 mm with a thickness of about 1.5 mm. This thickness is brought back to 0.2 mm between the two sheets of glass 2, 3, so as to be identical to the thickness of the spacers 4, by pressing during the firing phase. The width of the joint 6 is then at least 10 mm.

As for the spacers 4, and more particularly the method of obtaining them, FIG. 3 illustrates the passage from a ball or sphere to the parallel-faced bi-truncated spherical shape. In order to perform this conversion, the ball is eroded symmetrically in order to form two parallel faces, the material of volumes 7 and 8 being removed. This conversion must be very precise; this precision is necessary because the balls have a diameter of 0.4 mm and the height of the spacers 4 in the present case is 0.18 mm. The inventors have been able to develop a technique which is simple, accurate and leads to regularity of the dimensions from one spacer to the other. This technique consists in coating balls, with a diameter of 0.4 millimeters, in an organic resin, for example a polyester resin. The balls used are made of zirconium oxide; they are usually used to clean glass-making moulds by sand blasting. The resin is then polymerized after the balls have been arranged in a single layer, for example by squeezing them between two plates of glass.

The resin layer thus obtained is then eroded on its two faces by polishing so as to remove 0.11 mm of matter from the balls on either side with respect to the initial diameter corresponding to the volumes 7 and 8. Any other mechanical, thermal or chemical technique known to the person skilled in the art can be used. When the erosion is complete, the organic part of the layer is removed and the spacers 4 thus formed can be recovered in a filter.

FIGS. 4a, b and c particularly illustrate the advantages related to the shape of the spacers 4 for transporting and positioning them. In FIG. 4a, the spacers 4 have been arranged in bulk on a plate 9 subjected to a vibratory movement. The vibration of the plate 9, combined with the shape of the spacers 4, leads them to fall into place by themselves, one of the flat faces being in contact with the horizontal plane of the plate 9; this occurs because the parallel-faced bi-truncated spherical shape, which makes the spacers 4 similar to little barrels, during the vibration, produces an effect of the "toppling" type bringing the spacers 4 into a position of stable equilibrium, and thus onto one flat face. A suction tool 10 is brought in above this plate 9. This tool 10 is placed in contact with the spacers 4 which are arranged on the plate 9 and, due to the suction shown symbolically by the arrow 11, conveys the spacers 4 with it. To do that, the tool 10 is equipped, on its lower surface, with orifices 12 distributed uniformly with a pitch of 30 mm. The dimensions of these orifices 12 are such that the spacers 4 do not pass through, and therefore have a diameter less than 0.4 mm, said spacers 4 being sucked up by one of their flat faces.

FIG. 4b next shows the arrival of the tool 10, after its movement, above a sheet of glass 3 on which dots of bonding enamel 13 have already been deposited. These dots of enamel 13 have been deposited, for example, by screen printing with a silk screen. These enamel dots 13 are thus arranged precisely with a pitch of 30 mm, identical to that of the tool 10 for the orifices 12.

In FIG. 4c, after the spacers 4 are arranged on the enamel dots 13, the deposition on the glass 3 is achieved by stopping the suction, said spacers 4 being in contact with the enamel dots 13, and by slight blowing through the orifices 12, if appropriate, shown symbolically by the arrow 14. The operations of moving the tool 10 are advantageously automated in order to ensure superimposition of the spacers 4 and of the enamel dots 13. The dots of bonding enamel 13 have adequate viscosity to hold the spacers 4 in place, particularly when the second sheet of glass 2 is deposited. The fact that the spacers 4 are not bonded to the sheet of glass 2 greatly eases the fitting thereof. Moreover, the absence of this bonding may avoid the risks of breakage during the use of the glazing 1 if the two sheets of glass 2, 3 do not undergo exactly the same expansion.

During their deposition, the enamel dots 13 have a thickness of several tens of microns. This thickness is brought back to 20 microns by the pressure exerted during the firing of the enamel constituting the sealing joint 6 of FIG. 2 and that of the dots of bonding enamel 13 of FIG. 4b which is carried out simultaneously. The thickness corresponding to one enamel dot 13 plus one spacer 4 is then 0.2 mm.

Due to the squeezing of the enamel dots 13, a slight bead of enamel can form around the base of the spacer 4. The shape of the spacers 4 then exhibits an advantage due to its bulged part; this occurs because the bead which has formed rises slightly by capillary action along the spacer 4 and remains masked by the maximum diameter of the bulging part, 0.4 mm in the present case. That being so, the enamel dot 13 is practically invisible in transparence through the glazing 1 of FIG. 1, and the visible dots corresponding to the spacers 4 are all of the same diameter, which avoids visual disturbance when viewing through this glazing 1.

Figure 5:
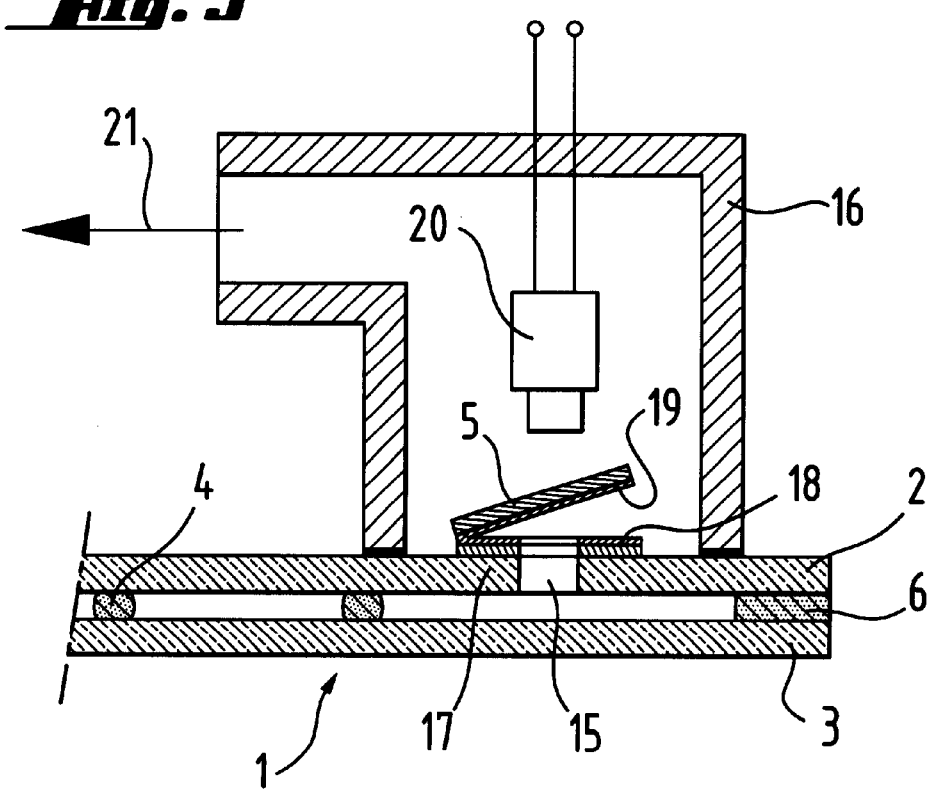
FIG. 5: a side view in elevation of a device according to the invention for forming the vacuum and stopping the hole.

After the firing operation during which the peripheral sealing joint 6 and the dots of bonding enamel 13 of FIG. 4b are fired at the same time, it is possible to carry out the evacuating operation via a hole 15 provided for this purpose, as seen in FIG. 5, then to plug this hole 15 using a disc 5. The hole 15 has been produced with a chamfer, not represented in the figures, in order to enhance the toughening results in the region thereof FIG. 5 illustrates this stage. A tool such as a bell housing 16 for forming the vacuum is applied to the glazing 1 hermetically around the hole 15. An arrow 21 symbolizes the suction, carried out in order to obtain a vacuum in the glazing 1 lying between $10^{-3}$ and $10^{-6}$ Torr, and preferably of the order of $10^{-4}$ Torr. When this value is reached, it is necessary to stop up the hole 15 hermetically. In order to do that, a ring of silver-based enamel 17 has been deposited around the hole 15. This enamel 17 has advantageously been fired simultaneously with the firing of the enamels forming the peripheral sealing joint 6 and the dots 13. After firing, the enamel ring 17 is tinned and thus includes a first layer of tin 18 soldered on one edge to the copper disc 5 by a second layer of tin 19. When the desired value of vacuum is reached, the suction is maintained, the temperature is raised to about 230° C. close to the hole 15 using an electric device 20 installed in the bell housing 16. This temperature rise allows melting of the layers of tin 18 and 19 and dropping of the disc 5 which covers over the hole 15. When the temperature is again lowered, the disc 5 is soldered to the glazing 1 by the ring of enamel 17 and of tin 18/19. Thus, the glazing 1 in FIG. 5 is obtained. The method of producing this glazing 1 thus presented is relatively simple to implement and leads to the perfectly hermetic vacuum glazing 1 having a satisfactory life span.

Moreover, the effectiveness of such insulating glazing 1 may be further enhanced by the use of at least one sheet of glass 2 or 3 coated with a low-emissive layer. Such layers are described, example, in the French Patent No. 2,701,474; these layers, in this application, make it possible to reduce energy losses by radiation from within a building to the outside. They can also avoid the formation of frost, particularly when they are placed out of doors.

The invention also provides for the possibility, in certain applications, of combining the function of bonding the spacers 4 with, for example, a decorative function. In such cases, dots of enamel 13 are no longer formed, but they may take the form of lines of enamel or any other shape. However, part of this pattern is always used to fix the spacers 4 which are then completely masked as they are coincident with the pattern.

What is claimed is:

1. Insulating vacuum glazing comprising:

two sheets of glass held apart from one another by spacers; and a peripheral sealing joint;

wherein the spacers are parallel-faced, bi-truncated spheres with bulging sides made of ceramic.

2. Glazing according to claim 1, wherein the parallel-faced, bi-truncated spheres with bulging sides are obtained from balls distributed in a single layer, coated in a material which can be poured and which can be separated from the spacers subsequently by one of thermal, chemical and mechanical action, and in that the layer is eroded on its two faces.

3. Glazing according to claim 1, wherein the sealing joint is an enamel with a firing temperature which is below 450° C.

4. Glazing according to claim 1, wherein the glazing includes on its outer surface an inorganic pellet or disc soldered to the glass by soldering material.

5. Glazing according to claim 4, wherein the soldering material is tin and contact with the glass is made by a silver-based enamel layer.

6. Glazing according to claim 1, wherein at least one of the sheets of glass has undergone a toughening process.

7. Glazing according to claim 1, wherein at least one sheet of glass is covered with one or more layers of spacers on at least one of its faces.

8. Glazing according to claim 2, wherein the sealing joint is an enamel with a firing temperature which is below 450° C.

* * * * *